United States Patent [19]
Grosboll et al.

[11] 3,888,633
[45] June 10, 1975

[54] CHEMICAL REACTOR HAVING MEANS FOR REMOVING IMPURITIES FROM A FLUID STREAM

[75] Inventors: Martin P. Grosboll, Homewood; Robert R. Edison, Olympia Fields, both of Ill.

[73] Assignee: Atlantic Richfield Company, Philadephia, Pa.

[22] Filed: May 24, 1973

[21] Appl. No.: 363,703

[52] U.S. Cl. ............... 23/284; 23/283; 23/285; 23/288 R; 208/146; 210/287
[51] Int. Cl. ....... B01j 9/00; B01j 4/00; B01d 23/20
[58] Field of Search ...... 23/288 A, 288 R, 283, 284, 23/285; 208/48 R, 166, 167; 210/291, 279, 289, 456; 261/97, 94–96; 134/104

[56] References Cited
UNITED STATES PATENTS

| 3,006,740 | 10/1961 | Maggio | 23/288 R |
| 3,112,256 | 11/1963 | Young et al. | 23/288 R |
| 3,146,189 | 8/1964 | Kunreuther et al. | 23/288 R |
| 3,431,084 | 3/1969 | Forbes | 23/288 R |
| 3,598,539 | 8/1971 | Pizzato | 23/288 R |
| 3,685,971 | 8/1972 | Carson | 23/288 R |
| 3,826,375 | 7/1974 | Fournier | 210/291 |

*Primary Examiner*—Barry S. Richman
*Assistant Examiner*—Bradley R. Garris
*Attorney, Agent, or Firm*—Frank J. Uxa

[57] ABSTRACT

An apparatus and method for removing particulate impurities from a fluid stream flowing into a bed of discrete solid elements, such as a bed of catalyst particles. An improved basket design is provided which maximizes the use of the bed and the mesh area of the basket to remove the particulate impurities in such a manner that the cycle life of the bed of catalyst particles or the like is extended; such improved design being the inclusion of a flow restricting orifice in the open upstream end of said basket.

8 Claims, 4 Drawing Figures

PATENTED JUN 10 1975 3,888,633

CHEMICAL REACTOR HAVING MEANS FOR REMOVING IMPURITIES FROM A FLUID STREAM

BACKGROUND OF THE INVENTION

The present invention relates to an apparatus and method for removing particulate impurities from a fluid stream flowing into a bed of discrete solid elements, and more particularly, relates to an improved basket design for removing impurities from hydrocarbon streams flowing into a bed of catalyst particles.

In any process which involves conducting a stream of fluid material, either gas, liquid or a mixture of gas and liquid, through a bed of discrete solid elements or particulate material, the cycle life of the bed itself, for example, a bed of catalyst particles in a chemical reaction zone, i.e., reactor, is a function of the amount of impurities which are entrained in the fluid stream. Since the particulate impurities are filtered out of the stream by the layer of bed material through which the stream enters, when a sufficiently large amount of these particulate impurities accumulate at or near the surface of the bed through which the stream enters, the pressure drop across the bed increases to a level which no longer permits acceptable operation of the bed. Hence, the reactor or the like containing the bed must be shut down.

It has heretofore been proposed to overcome this problem and extend the cycle life of a bed of catalytic particles or the like by providing the bed with a grid of cylindrical wire mesh containers, called "trash baskets," which are placed in the bed with an open end at or near the surface of the bed through which the fluid stream enters. In this way, the fluid stream initially follows the path of least resistance and enters the catalyst bed through the cylindrical wire mesh containers whereupon solid impurities entrained in the fluid are filtered therefrom, for example, by the wire mesh. Only after a significant accumulation of impurities has occurred in the vicinity of the wire mesh containers does the pressure drop across these containers increase to the point where the fluid stream substantially seeks entrance into the catalyst bed via that portion of the bed's surface through which the fluid stream enters which lies between the wire mesh containers, i.e., exposed surface. However, because the initial accumulation of collected impurities occurs in the vicinity of the bottom surface of the cylindrical containers, the collected impurities tend to filter out in a radial direction from the bottom of the containers and effectively close off the entire cross-section of the catalyst bed to the flow of the fluid stream therethrough. Thus, neither the vertical sidewalls of the wire mesh containers nor the exposed surface of the catalyst bed, which is still substantially in its initial clean condition, is effectively utilized as a situs for the entry of the fluid stream. Thus, although the use of the heretofore proposed wire mesh container has to some degree extended the cycle life of a catalyst bed, there still remains a significant portion of the bed which cannot effectively be employed, for example, to filter impurities from the fluid stream.

SUMMARY OF THE INVENTION

It is therefore an object of the present invention to provide an improved device for removing particulate impurities from a fluid stream flowing into a bed of discrete solid elements.

It is another object of the present invention to provide an improved apparatus for insertion into a bed of discrete solid elements which permits a maximum percentage of such bed to be effectively utilized to remove entrained particulate impurities from the incoming fluid stream.

Another object of the present invention resides in the provision of an improved apparatus for contacting a fluid with a bed of discrete solid elements, wherein the cycle life of the bed is significantly extended in comparison to known devices of the same type.

It is still another object of the present invention to provide a method for removing particulate impurities from a fluid stream flowing into a bed of discrete solid elements whereby the cycle life of the bed is significantly increased.

In accomplishing the foregoing objects, there is provided in accordance with the present invention an apparatus for removing particulate impurities from a fluid stream flowing into a bed of discrete solid elements which comprises a hollow elongated basket member adapted to be generally aligned along its longitudinal axis with the direction of fluid flow and adapted to extend along a substantial portion, e.g., a major portion and preferably at least about 80%, of its length into the bed of discrete solid elements. The basket member is defined by side walls and a bottom end wall, and the bottom end wall and the bottom portion of the sidewalls adjacent the bottom end wall are fabricated of open mesh construction, whereas the top portion of the sidewalls adjacent the end of the basket opposite the bottom end wall are fabricated of solid material and are of a substantially closed construction, preferably completely closed. The closed top portion of the sidewalls is of a length sufficient to extend below the surface of the bed of discrete solid elements into which a substantial portion of the apparatus is extended. This top portion of the basket contains a means for at least partially restricting the flow of fluid into the basket, typically one or more orifices contained in a solid top end wall of the basket. The apparatus may also comprise a cap member having a larger cross-section than the basket and being positioned in telescoping relationship with the top of the basket in order to provide a means for causing a temporary reversal in the direction of flow of the fluid stream before it enters the basket member.

Also provided in accordance with the present invention is an apparatus for contacting a fluid stream and a bed of discrete solid elements, which comprises a chamber, a bed of discrete solid elements contained within the chamber, such as a bed of catalyst particles and the like, entrance and exit means for the fluid stream and at least one apparatus of the type described immediately above for removing particulate impurities from the fluid stream. In a preferred embodiment, the fluid entrance means is located above the fluid exit means so that the fluid flows through the bed in a generally downward direction.

The present invention also provides an improved method for removing particulate impurities from a fluid stream flowing into a bed of discrete solid elements. In this method, a fluid stream is conveyed, preferably in a generally downward direction, to one surface of a bed of solid elements having at least one hollow elongated basket member with its longitudinal axis aligned with the direction of fluid flow and extending along a substantial portion of its length into the bed of solid elements. The basket member is defined by sidewalls and a bottom end wall, with the bottom end wall and bottom portion of the sidewalls adjacent thereto being of open mesh construction and with the top portion of the sidewalls being of substantially closed construction, preferably completely closed. At least a portion of the closed top wall portion extends into the bed. The flow of the fluid stream is initially at least partially restricted from passing into each basket member, thereby causing the fluid stream to enter the bed at the exposed surface thereof lying adjacent to the provided basket members and this exposed surface removes particulate impurities from the stream until the pressure drop the fluid experiences entering the bed through this exposed surface, exceeds the pressure drop across each basket member.

Other objects, features and advantages of the present invention will become apparent from the following detailed description of the invention, when considered in conjunction with the accompanying drawings.

DETAILED DESCRIPTION OF THE INVENTION

The present invention finds a particularly advantageous application in connection with increasing the cycle life of a bed of discrete solid elements comprising catalyst particles with which a fluid stream, preferably flowing in a generally downward direction, is to be contacted during the carrying out of any one of a multitude of well known chemical reactions. For example, the trash basket devices of the invention may be employed in a catalytic reactor vessel utilized to contact a downwardly flowing stream of liquid hydrocarbon material in admixture with gaseous hydrogen with a conventional hydro-forming or reforming catalyst. Although the present invention will be described with reference to a specific embodiment involving a bed of discrete solid elements comprising catalytic material of the foregoing type, it is to be understood that the principles of the invention may be equivalently utilized in conjunction with other processes wherein a fluid stream is to be contacted with a bed of discrete particulate material.

Figure 1:
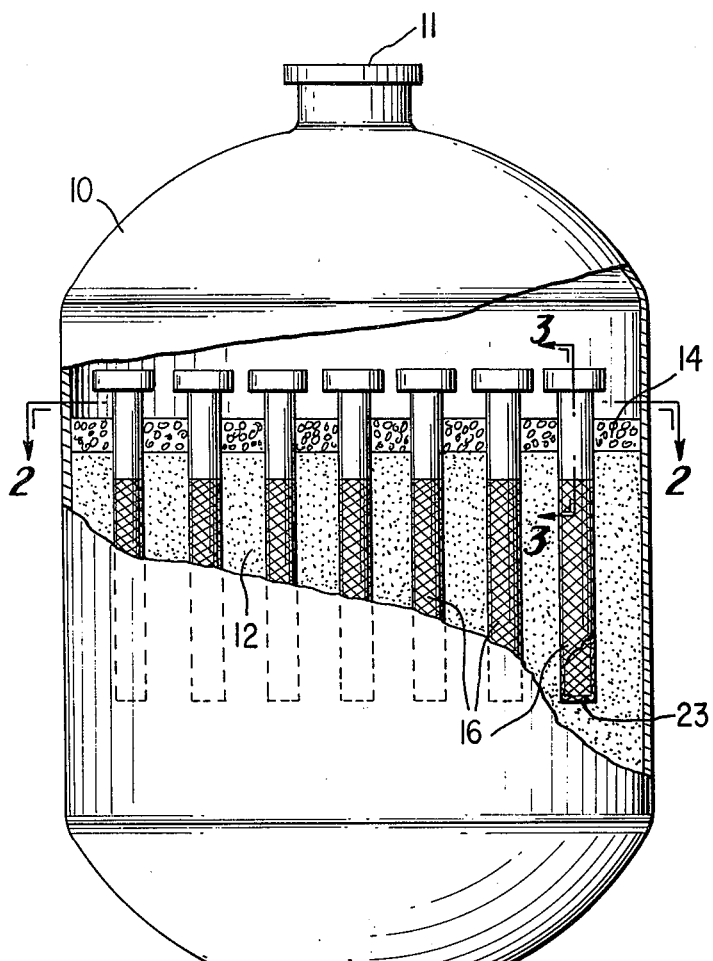
FIG. 1 is a front elevation view, partially in section, of a reactor and bed of discrete solid elements therein having a plurality of impurity removing devices in accordance with the invention.
Figure 2:
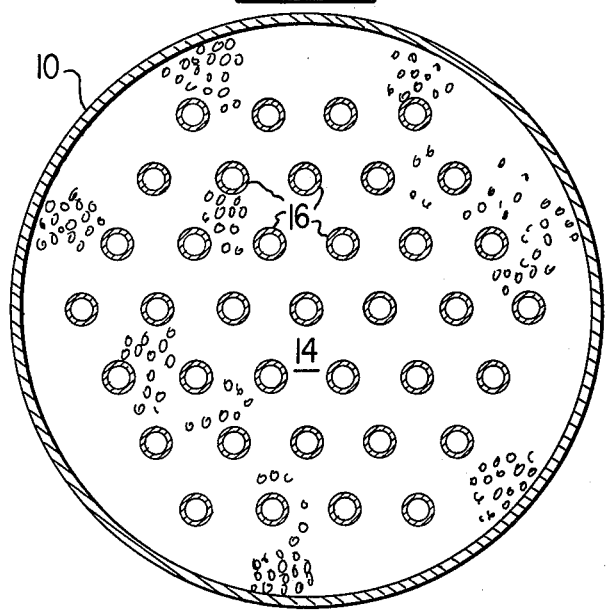
FIG. 2 is a top view of FIG. 1 taken along the line 2—2.

Referring now to the drawings, in FIG. 1 there is illustrated a conventional catalytic reactor vessel 10 containing a packed bed comprising finely divided catalytic material 12, and a relatively thin layer of essentially catalytically inert alumina balls 14 covering the top surface of the catalytic material 12. One function of the alumina balls 14 is to aid in securing the bed of catalytic material 12 in place. Spaced at equidistant intervals across the entire top surface area of the alumina balls 14 are a plurality of trash basket members 16, the placement of which may be envisioned better by reference to FIG. 2 of the drawings. The basket members 16 are inserted into the catalytic material 12 and extend thereinto over a substantial portion of their length, leaving only a short portion extending above the surface of the catalytic material 12 and its covering layer of alumina balls 14.

Figure 3:
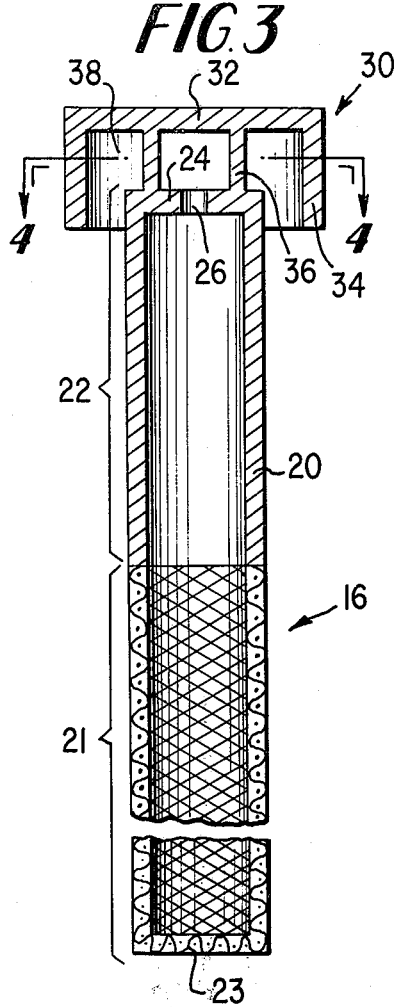
FIG. 3 is a cross-sectional view taken along line 3—3 in FIG. 1 of a device of the invention for removing particulate impurities from a fluid stream.

With reference to FIG. 3 of the drawings, the structure of the basket member 16 may be seen in greater detail. Each basket member 16 is defined essentially by sidewalls 20 extending from top to bottom and a bottom wall 23, with the top of each basket member 16 remaining generally open. The lower portion 21 of the sidewalls 20, extending over a substantial portion of the length of each basket member 16, is fabricated from an open mesh type material, such as woven wire or the like. The size of the openings in the mesh is generally not critical as long as it is smaller than the average size of the discrete solid elements making up the bed which are in contact with the mesh. The bottom end wall 23 is likewise fabricated from this open mesh material. On the other hand, the upper portion 22 of the sidewall 20 of each basket member 16 extends from the very top of the basket member 16 downwardly to a point along the sidewall 20 which will lie sufficiently beneath the surface of the catalytic bed 12 and the alumina balls 14 so that fluid material entering the exposed surface of the alumina balls 14 lying between each of the basket members 16 will not be short circuited into the spaced basket members 16 through lower portion 21 of sidewall 20.

In the basic embodiment of the present invention, the top end of each basket member 16 embodies a means for at least partially restricting the flow of fluid material into the basket member 16. In the illustrated embodiment, this restricting means includes a solid end wall 24 provided at the top end of basket member 16 and having a single orifice 26 passing therethrough. Obviously, a plurality of such orifices could alternatively be provided, or there could be provided a solid member of a shape sufficient to cover or block only a portion of the opening at the top end of basket member 16. Means could also be provided for adjusting the percentage of the opening at the top of basket member 16 which is to be left open for the passage of fluid material.

Figure 4:
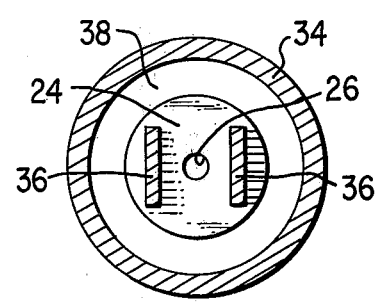
FIG. 4 is a view taken along line 4—4 in FIG. 3.

In another and more preferred embodiment of the present invention, each basket member 16 is provided with an additional means in order to cause a reversal of the direction of flow of the fluid material immediately prior to its entrance into the basket member 16. With reference to FIGS. 3 and 4 of the drawings, the foregoing reversal of the fluid stream is accomplished by providing a cap member 30 which is of a generally inverted U-shaped configuration having a solid end wall 32 and solid downwardly depending walls or flanges 34. The cap member 30 is of larger cross-section than the basket member 16 and is placed in telescoping relationship therewith in such a manner that the lower edges of downwardly depending walls 34 extend below the level of the top edge of sidewalls 22 of basket member 16. A plurality of space supporting members 36 are provided at intervals about the circumference of solid end wall 24 in order to secure the cap member 30 in place. In order for fluid to enter the basket member 16, it must reverse its direction of flow and pass upwardly through the annular area 38 defined between the cap member 30 and the sidewalls 22 of basket member 16. This reversal of direction accomplishes an initial settling out and elimination of larger particles which may be entrained in the fluid stream.

In operation, a fluid stream, for example, an essentially all liquid stream, a mixed liquid-gaseous stream or, preferably, an essentially all gaseous stream, is conducted into the catalytic reactor 10 through the entrance port 11 thereof and is directed downwardly toward the catalytic material 12. Because of the fact that the top opening of each basket member 16 is partially restricted, the fluid stream experiences a lower pressure drop by entering the catalytic material 12 through the exposed surface of the alumina balls 14 rather than through the basket member 16. Thus, initially, the fluid stream enters the catalytic material 12 by entering the exposed surface of the alumina balls 14. The portion of the alumina balls 14 and catalytic material 12 at or near the exposed top surface of the alumina balls 14 are initially clean and, therefore, serve to remove entrained particulate impurities from the fluid stream during the initial stages of operation. After the reactor 10 has been in operation for a period of time, the portion of the alumina balls 14 and catalytic material 12 at or near the exposed surface of the alumina balls 14 begins to become fouled with the impurities collected, thereby increasing the pressure drop experienced by the fluid as it passes via its initial route. Eventually, this pressure drop becomes equivalent to and then larger than the pressure drop which the fluid stream experiences across the basket member 16. At this point, the fluid stream preferentially enters the basket member 16 and entrained particulate impurities in the stream are removed along that portion of the catalyst material 12 surrounding the lower sidewall portion 21 and bottom wall 23 mesh configuration and by the mesh itself of the basket member 16, and particularly, the bottom wall 23 of the basket member 16. Thus, effective use is made of both the upper portion of the catalyst material 12 and the inner surfaces of the basket member 16 themselves to remove entrained particulate impurities from the fluid stream, thereby resulting in a maximal increase in the cycle life of the catalytic material 12.

In the heretofore described preferred embodiment of the invention wherein cap members 30 are provided over each of the basket members 16, the operation is essentially identical as above described, except that the larger particles entrained in the fluid stream tend to settle out at the point where the fluid stream reverses its flow immediately before entering the basket member 16, and therefore, an additional means of removing impurities from the fluid stream is provided to even more effectively increase the effective cycle life of the catalytic material 12.

The improved trash basket design of the present invention is, as heretofore mentioned, most preferably employed within the context of a catalytic reactor, and in general, the improved basket design can be employed in any conventional reactor. Such reactors typically have cross-sectional areas, preferably circular, ranging from about 0.5 Ft.$^2$ or less to about 170 Ft.$^2$ or more, preferably from about 5 Ft.$^2$ to about 150 Ft.$^2$, and from about 5 Ft. or less to about 125 Ft. or more, preferably from about 10 Ft. to about 70 Ft., in length. The particles used to form the bed within such a reactor may have any suitable geometry, e.g., spheres, cylinders, pills, tabletts, irregularly shaped particles, etc. Preferably, the maximum linear dimension of the particles does not exceed about 3% of the reactor diameter. Typically, such catalyst particles have a minimum dimension of at least about 0.01 in. and a maximum dimension up to about ½ in. or 1 in. or more. The trash basket devices of the present invention have particular utility when employed in reactor systems which carry out the catalytic chemical conversion of hydrocarbons such as that involved in petroleum refining and petrochemical processing and the like. Included among the conventional and well known hydrocarbon chemical reactions which may be promoted by such catalyst and in which the present apparatus and methods may be useful are oxidation, hydrosulfurization, hydrocracking, cracking, reforming, hydrogenation, polymerization, alkylation, isomerization, disproportionation and the like. Typical operating conditions and catalyst compositions employed in each of these catalytic reaction systems are well known to those skilled in the art and may be varied to meet the requirements of the individual hydrocarbon process. For this reason, an extensive list of reaction conditions and catalyst compositions is not included herein. However, to illustrate, typical examples of hydrocarbon hydrosulfurization catalysts comprise a support and any one or more of the transition metals, metal oxides, metal sulfides, or other metal salts which are known to catalyze hydrosulfurization. Hydrocarbon reforming catalysts typically comprise at least one platinum group metal on a support. Typical examples of hydrocracking catalysts include crystalline metallic aluminosilicate zeolites, having a platinum group metal, e.g., platinum or palladium, deposited thereon or composited therewith. Hydrogenation catalysts may comprise at least one Group VIII metal of the Periodic Table, such as nickel, cobalt, iron, the platinum group metals such as palladium, platinum, iridium, or ruthenium and mixtures thereof on a suitable support. Suitable carriers or supports for these catalysts may comprise materials such as silica, alumina, zirconia, titania, magnesia, boria, silica-alumina, silica-magnesia, acidic clays, halided alumina and the like. Mixtures of more than one of such materials may be used in these catalysts.

In a typical embodiment of the present invention, a reactor vessel is employed having a 13 foot inside diameter and a length of 50 feet. A bed of 1/16 inch diameter catalyst particles is provided within the reactor vessel and the catalyst bed contains a 6 inch thick layer of alumina balls having a diameter of approximately ¾ inch. Distributed uniformly at equidistant 20-inch spacing from center to center are 55 trash basket units according to the present invention having a cylindrical shape and a diameter of 8 inches. Each basket has a total length of 65 inches, with the lower open mesh portion of the basket constituting 48 inches of the total length and the upper closed wall portion constituting the remaining 17 inches of length. Each basket extends beneath the upper surface of the alumina balls approximately 60 inches thereby assuring that the solid closed top wall portion of each basket extends about 12 inches below this surface. The necessary pressure drop across the basket member is achieved by providing each basket member with a solid top end wall of annular configuration having an orifice of about 2½ inches in diameter remaining open for the passage of fluid material. In the most preferred embodiment, each basket is provided with a 10 inch diameter circular cap having 3-inch downwardly depending sidewalls. The cap is positioned approximately 2 inches above the top surface of each basket in order to provide a one inch telescoping overlap of the cap walls and the basket sidewalls.

Therefore, it will be appreciated that the present invention provides an improved trash basket design for use in apparatus and methods for contacting a stream of fluid material with a bed of discrete solid elements, whereby the effective cycle life of the bed, for example, a bed of catalyst particles, is significantly increased as a result of more efficient utilization of that portion of the bed at or near the surface through which a fluid stream enters the bed to, for example, remove entrained particulate impurities from the fluid stream.

While the foregoing invention has been described and pointed out with reference to a single preferred embodiment thereof, it will be appreciated that various minor modifications, alterations, and additions may be made to the disclosed trash basket design without departing from the spirit of the invention. Therefore, it is intended that the invention be limited only by the scope of the claims appended hereto.

The embodiments of the invention in which an exclusive property or privilege is claimed are defined as follows:

1. A chemical reactor for processing a fluid stream comprising a chamber, a bed of discrete solid particles contained within said chamber, entrance means and exit means for said fluid stream with said entrance means being located above said exit means and said reactor having means for removing particulate impurities which may be present in said fluid stream, said means comprising at least one hollow elongated basket member being open at the upstream end thereof, and being adapted to be generally aligned along the principal axis thereof with the direction of fluid flow and to be extended along a substantial portion of the length thereof into said bed of solid particles, said basket member being defined by impervious upstream and pervious downstream sidewalls and a pervious downstream endwall, the pervious downstream endwall and pervious downstream sidewall adjacent said pervious downstream endwall being of open mesh construction, said impervious upstream sidewall being of length sufficient to extend below the surface of said bed and said open upstream end of said basket member containing flow restricting means arranged and constructed so as to provide said open upstream end with a cross-sectional flow path area which is substantially less than the cross-sectional flow path area defined by said impervious upstream sidewall.

2. A reactor as defined by claim 1, wherein the cross-sectional configuration of said basket member is round.

3. A reactor as defined by claim 1, wherein said bed of discrete solid particles comprises a bed of catalyst particles.

4. A reactor as defined by claim 1, wherein said basket member further includes means to cause a temporary reversal in the direction of flow of said fluid stream before said stream enters said open upstream end of said basket member.

5. A reactor as defined by claim 4, wherein said flow reversal means comprises a cap member having a larger cross-section than said basket member and being positioned in telescoping relationship with said open upstream end of said basket member.

6. A reactor as defined by claim 1, wherein said flow restricting means comprises an impervious upstream endwall which includes at least one orifice.

7. A reactor as defined by claim 6, wherein said basket member further includes means to cause a temporary reversal in the direction of flow of said fluid stream before said stream enters said open upstream end of said basket member.

8. A reactor as defined by claim 7, wherein said flow restricting means has one orifice.

\* \* \* \* \*